United States Patent
Fagergren et al.

(10) Patent No.: US 10,991,354 B2
(45) Date of Patent: Apr. 27, 2021

(54) HULL-FITTED ELECTRONIC DEVICE FOR A VESSEL

(71) Applicant: Consilium AB, Nacka (SE)

(72) Inventors: Anders Fagergren, Nacka (SE); Lars Nygren, Nacka (SE)

(73) Assignee: Consilium SAL Navigation AB

( * ) Notice: Subject to any disclaimer, the term of this patent is extended or adjusted under 35 U.S.C. 154(b) by 283 days.

(21) Appl. No.: 15/576,546

(22) PCT Filed: May 26, 2016

(86) PCT No.: PCT/EP2016/061927
§ 371 (c)(1),
(2) Date: Nov. 22, 2017

(87) PCT Pub. No.: WO2016/193120
PCT Pub. Date: Dec. 8, 2016

(65) Prior Publication Data
US 2018/0151165 A1    May 31, 2018

(30) Foreign Application Priority Data
May 29, 2015 (EP) .................................. 15169770

(51) Int. Cl.
*G10K 11/00* (2006.01)
*G01S 7/521* (2006.01)

(52) U.S. Cl.
CPC ............ *G10K 11/006* (2013.01); *G01S 7/521* (2013.01)

(58) Field of Classification Search
None
See application file for complete search history.

(56) References Cited

U.S. PATENT DOCUMENTS 3,123,176 A * 3/1964 Greenberg ........... G10K 11/004
                                                            181/198
3,495,211 A * 2/1970 Harris .................... G10K 13/00
                                                            367/174

(Continued)

FOREIGN PATENT DOCUMENTS

CN    101072452 A  * 11/2007
DE      3025233 A1    1/1981

(Continued)

OTHER PUBLICATIONS

EP 0340624 A2, 10, Cited in Office Action dated Apr. 10, 2019 in related European Patent Application No. 15 169 770.3; Machine translation provided.

(Continued)

*Primary Examiner* — Isam A Alsomiri
*Assistant Examiner* — Jonathan D Armstrong
(74) *Attorney, Agent, or Firm* — Condo Roccia Koptiw LLP

(57) ABSTRACT

A hull-fitted electronic device (2) for a vessel is provided. The hull-fitted electronic device is adapted to be attached to a seat (10) having a through hole (11), the seat being attachable to a hull (20) of the vessel such that the through hole of the seat is aligned with a through hole (12) of the hull. The hull-fitted electronic device comprises a transducer (16) adapted to generate a signal to be transmitted into the water outside the hull, and a housing (14) encapsulating the transducer and having a lower portion (3) and a flange portion (4). The lower portion and at least the portion of the flange portion located closest to the lower portion are covered by a surface (5) of a material (17) being watertight and transparent to the signal generated by the transducer. A portion of the surface forms a window (13) of the housing arranged to transmit the signal of the transducer.

20 Claims, 3 Drawing Sheets

(56) References Cited

U.S. PATENT DOCUMENTS

| | | | |
|---|---|---|---|
| 3,647,230 A * | 3/1972 | Smedley | E21B 33/12 277/335 |
| 3,734,179 A * | 5/1973 | Smedley | E21B 33/12 166/106 |
| 3,748,637 A * | 7/1973 | Larson | G10K 11/004 367/151 |
| 3,780,220 A * | 12/1973 | Fugitt | B63C 11/48 348/81 |
| 3,801,839 A | 3/1974 | Yo | |
| 3,012,038 A | 3/1976 | Massa | |
| 4,326,274 A | 4/1982 | Hotta et al. | |
| 4,388,709 A * | 6/1983 | Reed | G10K 11/006 114/244 |
| 5,088,068 A * | 2/1992 | Schaill | G10K 11/006 181/124 |
| 5,186,428 A * | 2/1993 | Falkenberg | G10K 11/006 248/284.1 |
| 5,297,109 A * | 3/1994 | Barksdale, Jr. | E02B 17/0034 367/104 |
| 5,661,466 A * | 8/1997 | Pearson | G01D 5/1655 180/444 |
| 5,697,319 A * | 12/1997 | Steensland | B63B 5/24 114/343 |
| 5,838,635 A | 11/1998 | Masreliez | |
| 6,053,683 A * | 4/2000 | Cabiran | F16B 37/14 411/372.6 |
| 6,247,364 B1 * | 6/2001 | Kicher | G01P 15/08 73/514.33 |
| 6,269,763 B1 * | 8/2001 | Woodland | A62C 29/00 114/144 A |
| 6,276,503 B1 * | 8/2001 | Laughlin, Jr. | B65H 75/403 191/12.2 A |
| 6,791,902 B1 * | 9/2004 | Steiner | G01S 7/521 367/111 |
| 7,545,082 B2 | 6/2009 | Nakajima | |
| 8,677,920 B1 * | 3/2014 | Jeng | B63B 3/08 114/312 |
| 9,851,024 B2 * | 12/2017 | Piotrowski | F16B 33/004 |
| 2004/0129078 A1 * | 7/2004 | Kicher | G01P 15/123 73/514.14 |
| 2005/0111222 A1 | 5/2005 | Olsson et al. | |
| 2006/0108022 A1 * | 5/2006 | Carter | B65B 39/12 141/340 |
| 2008/0083360 A1 * | 4/2008 | Rowley | B63C 11/49 114/66 |
| 2008/0099414 A1 * | 5/2008 | Haslem | B01D 17/0214 210/800 |
| 2008/0299842 A1 * | 12/2008 | Ellis | B63B 35/71 440/6 |
| 2009/0223296 A1 | 9/2009 | Sato et al. | |
| 2013/0016588 A1 * | 1/2013 | O'Dell | G10K 11/006 367/173 |
| 2018/0001986 A1 * | 1/2018 | Nutz | B63H 16/20 |
| 2018/0033417 A1 * | 2/2018 | Antao | G10K 11/006 |

FOREIGN PATENT DOCUMENTS

| | | |
|---|---|---|
| DE | 3012038 A1 | 10/1981 |
| DE | 10 2006 026 247 A1 | 12/2006 |
| EP | 0340624 A2 | 11/1989 |
| WO | WO 2012/145479 A1 | 10/2012 |

OTHER PUBLICATIONS

DE 3012038 A1, 12, Document cited in search report of EP 0340624 A3; Machine translation provided.
DE 3025233 A1, 11, U.S. Pat. No. 4,326,274, A, 9.
DE 10 2006 026 247 A1, 4, U.S. Pat. No. 7,545,082 B2, 2.

* cited by examiner

HULL-FITTED ELECTRONIC DEVICE FOR A VESSEL

CROSS REFERENCE TO RELATED APPLICATIONS

This application is the National Stage Entry under 35 U.S.C. § 371 of Patent Cooperation Treaty Application No. PCT/EP2016/061927, filed 26 May 2016, which claims the benefit of European Application No. 15169770.3, filed 29 May 2015, the contents of which are hereby incorporated by reference herein.

FIELD OF THE INVENTION

The present invention generally relates to the field of hull-fitted electronic devices for vessels.

BACKGROUND OF THE INVENTION

Marine vessels are normally equipped with hull-fitted electronic devices, which may be used e.g. for navigation. Examples of such hull-fitted electronic devices are speed logs and echo sounders. A hull-fitted electronic device may comprise a transducer adapted to generate a signal to be transmitted into the water outside the hull. The transducer may typically be encapsulated in a housing, which is mounted in a through hole of the hull such that an end portion of the housing is exposed to the water outside the hull. As such hull-fitted electronic devices are mounted at the vessel-water interface, demands are high on water tight seals for avoiding water leakage into the housing as well as into the vessel.

Normally, a sealing between the housing and surrounding mounting structure is accomplished by O-rings extending around a cylindrical portion of the housing adapted to be fitted in a through hole of the surrounding mounting structure. A drawback with such an arrangement is that the O-ring must be fitted tightly to the cylindrical portion of the housing in order to provide sufficient seal, whereby the tolerance of the O-ring fitting around the housing need to be very accurate, which in turn makes manufacturing and installation of the hull-fitted electronic device difficult. Further, there is a risk that the O-ring may come off when the cylindrical portion of the housing is inserted in the through hole of the mounting structure upon installation, which increases the risk of water leakage.

SUMMARY OF THE INVENTION

It would be advantageous to achieve a hull-fitted electronic device overcoming, or at least alleviating, the above mentioned drawbacks. In particular, it would be desirable to enable a hull-fitted electronic device which is easier to manufacture and install and which reduces the risk of water leakage.

To better address one or more of these concerns, a hull-fitted electronic device having the features defined in the independent claim is provided. Preferable embodiments are defined in the dependent claims.

Hence, according to an aspect, a hull-fitted electronic device for a vessel is provided. The hull-fitted electronic device is adapted to be attached to a seat having a through hole, the seat being attachable to a hull of the vessel such that the through hole of the seat is aligned with a through hole of the hull. The hull-fitted electronic device comprises a transducer adapted to generate a signal to be transmitted into the water outside the hull, and a housing encapsulating the transducer and having a lower portion adapted to be inserted in the through hole of the seat and a flange portion adapted to be attached to the seat so as to support the lower portion in the through hole of the seat. The lower portion and at least the portion of the flange portion located closest to the lower portion have a surface of a material being watertight and transparent to the signal generated by the transducer. Further, a portion of the surface forms a window of the housing arranged to transmit the signal generated by the transducer to the water outside the hull.

Since the watertight surface extends across the lower portion and further up onto the flange portion, a gasket for sealing between the housing and the seat can be positioned between the flange portion and the seat rather than between the lower portion and the seat. Further, the gasket may not necessarily fit tightly around the lower portion but is allowed to have an inner diameter larger than a diameter (or width) of the lower portion. Thereby, O-rings surrounding the lower portion may be avoided. A gasket of a more robust type, such as a flat plastic or rubber gasket, may be used instead. The hull-fitted device is thereby easier to manufacture and install and the risk of water leakage between the housing and the seat is reduced.

The portion of the housing delimited by the gasket when the hull-fitted electronic device is mounted to the seat may be referred to as a wet portion of the housing, that is, the portion of the housing exposed to surrounding water when the hull-fitted electronic device is in use. The remaining portion of the housing may be referred to as a dry portion of the housing, that is, the portion of the housing sealed from surrounding water. With the present aspect, the wet portion may reach all the way up onto the flange portion and may be completely covered by the surface of the watertight and transducer signal transparent material. Hence, the surface may provide a watertight barrier covering the whole wet portion of the housing.

Further, as the watertight material is transparent to the signal of the transducer, the one and the same material may cover the whole lower portion and there is no need for a separate window portion, thereby reducing the risk of water leakage into the housing.

In the present specification, the through hole of the seat being aligned with the through hole of the hull may include that the two through holes at least partially overlap or at least partially coincide such that a common through hole is provided. Hence, the centers of the two through holes may not necessarily coincide as long as a common through hole is provided such that an end portion of the lower portion can be exposed to surrounding water.

According to an embodiment, the surface of the watertight and transducer signal transparent material may be free from joints. Hence, the surface may be a surface of a single piece of material and may seamlessly cover the lower portion and at least the portion of the flange portion located closest to the lower portion, whereby the risk of water leakage is further reduced.

According to an embodiment, the material may comprise a plastic, such as epoxy or polyurethane. Plastic is normally both waterresistant and transparent to both EM (electromagnetic) and ultrasound signals.

According to an embodiment, a surface of the flange portion facing the seat may be at least partially covered by the material. The surface of the flange portion facing the seat is the portion of the housing resting (via the gasket) on the seat. This surface of the flange portion may be referred to as the underside of the flange portion. Hence, the surface of the watertight and transducer signal transparent material may extend up onto the underside of the flange portion.

According to an embodiment, the lower portion may be cylindrical. The through hole of the seat may optionally also be cylindrical. However, since the gasket may be positioned between the flange portion and the seat and not between the lower portion and the seat, the cross-section of the lower portion may not necessarily be circular in order to fit in an O-ring, but may have any other cross-sectional geometry.

According to an embodiment, the hull-fitted electronic device may be a navigation device, such as a speed log or an echo sounder.

According to an embodiment, an arrangement for a vessel is provided. The arrangement may comprise a seat comprising a through hole and adapted to be attached to a hull of the vessel such that the through hole of the seat is aligned with a through hole of the hull. The arrangement may further comprise a hull-fitted electronic device as defined in any one of the preceding embodiments.

According to an embodiment, the arrangement may further comprise a gasket adapted to be fitted between the flange portion and the seat for preventing water leakage between the housing and the seat. Since the gasket does not have to fit tightly around the lower portion of the housing, a gasket of a more robust type than an O-ring may be used, which reduces the risk of damage of the gasket.

According to an embodiment, at least a portion of the flange portion delimited by the gasket when the housing is mounted to the seat may have a surface of the watertight and transducer signal transparent material. Hence, at least the wet portion of the housing may have such surface so as to reduce the risk of water leaking into the housing.

According to an embodiment, the through hole of the seat may be tapered in a direction towards the water outside the hull so as to facilitate removal of the hull-fitted electronic device from the seat. With a non-tapered through hole, the lower portion may tend to stick to the wall of the seat forming the through hole. For example, the seat may be continuously tapered in the direction towards the water outside the hull. Alternatively or as a complement, the seat may be stepwise tapered in the direction towards the water outside the hull. Hence, an upper portion of the through hole may have a diameter larger than that of a lower portion of the through hole. The lower portion may optionally have a corresponding shape adapted to match the through hole of the seat. Alternatively, the lower portion may have a straight (non-tapered) shape.

It is noted that embodiments of the invention relate to all possible combinations of features recited in the claims.

BRIEF DESCRIPTION OF THE DRAWINGS

These and other aspects will now be described in more detail in the following illustrative and non-limiting detailed description of embodiments, with reference to the appended drawings.

All the figures are schematic, not necessarily to scale, and generally only show parts which are necessary in order to elucidate the embodiments, wherein other parts may be omitted. Like reference numerals refer to like elements throughout the description.

DETAILED DESCRIPTION OF EMBODIMENTS

Figure 1:
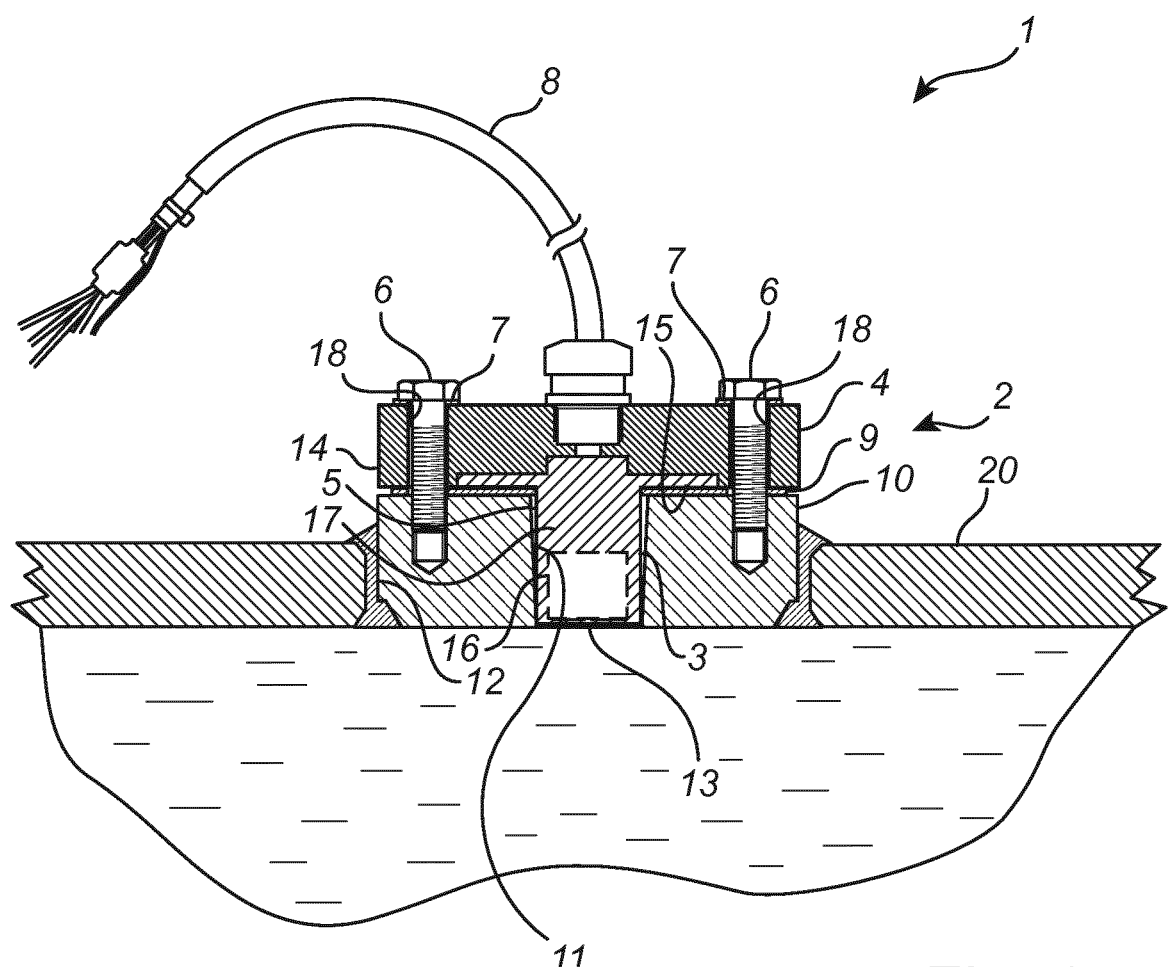
FIG. 1 shows a cross-section of an arrangement according to an embodiment.
Figure 2:
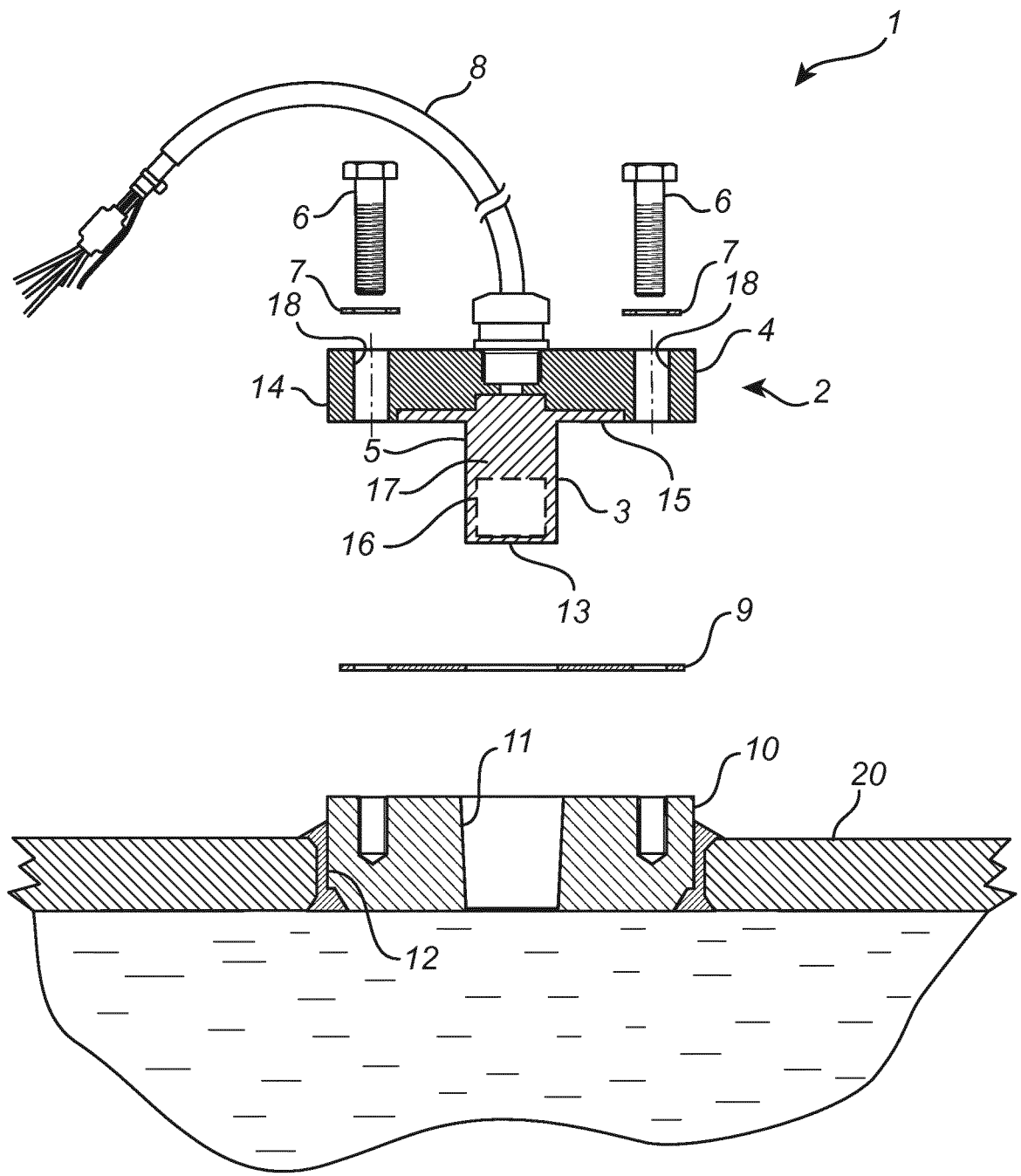
FIG. 2 is an exploded view of the arrangement in FIG. 1.

An arrangement 1 for a vessel according to an embodiment will be described with reference to FIGS. 1 and 2.

The arrangement 1 comprises a seat 10 and a hull-fitted electronic device 2 adapted to be mounted to the seat 10. The seat 10 comprises a through hole 11 extending throughout the seat 10. The seat 10 is in turn fastened to a hull 20 of the vessel such that the through hole 11 of the seat 10 is aligned with a through hole 12 of the hull 20. In the present example, the seat 10 is mounted in the through hole 12 of the hull. Alternatively, the seat may be mounted on the inside of the hull such that the through hole of the seat overlaps the through hole of the hull (not shown). The seat 10 may be fastened to the hull 20 e.g. by means of welding for preventing water leakage between the hull 20 and the seat 10.

The hull-fitted electronic device 2 may comprise a transducer 16 encapsulated by a housing 14. A cable 8 may connect the hull-fitted electronic device 2 to a control system or the like. The transducer 16 may e.g. be an EM (electromagnetic) transducer or an ultrasound transducer adapted to transmit an EM signal or an ultrasound signal, respectively. The housing 14 may comprise a lower portion 3 and a flange portion 4. The lower portion 3 may be shaped so as to fit in the through hole 11 of the seat 10. Optionally, the lower portion 3 may be substantially cylindrical. The flange portion 4 may be shaped so as to rest on an upper surface of the seat 10, thereby supporting the lower portion 3 in the through hole 11 of the seat 10. The flange portion 4 may e.g. have a larger diameter (or width) than the lower portion 3, and may optionally also be cylindrical. The flange portion 4 may be fastened to the seat 10 e.g. by means of bolts 6. The bolts 6 may extend through the flange portion 4 and into the seat 10. Gaskets 7 may be arranged for providing a sealing between the bolts 6 and the hull-fitted electronic device 2.

The lower portion 3 and at least the portion of the flange portion 4 located closest to the lower portion 3 may be covered by a surface 5 of a material 17 being watertight and transparent to signals produced by the transducer 16. In the present example, a portion of a surface 15 of the flange portion 4 facing the seat 10 is covered by the surface 5 of the material 17 being watertight and transparent to signals produced by the transducer 16. The material 17 may e.g. comprise plastics, such as epoxy or polyurethane. A portion of the surface 5 may form a window 13 for the signals produced by the transducer 16. For example, the window 13 may be located at the end portion (bottom end) of the lower portion 3, such as at the side of the lower portion 3 facing the water outside the hull 20. The surface 5 of the watertight and transducer signal transparent material 17 may e.g. extend substantially up to the recesses 18 for the bolts 6.

In the present example, the transducer 16 is encapsulated by (such as molded into) the watertight and transducer signal transparent material 17. The lower portion 3 of the housing 14 may e.g. be formed substantially entirely by the watertight and transducer signal transparent material 17. Alternatively, a separate layer of the watertight and transducer signal transparent material may cover the lower portion (which may be formed by another material, such as metal) and at least the portion of the flange portion located closest to the lower portion (not shown).

The arrangement 1 may further comprise a gasket 9 arranged between the flange portion 4 and the seat 10 so as to provide a seal between the housing 14 and the seat 10. The gasket 9 may e.g. be flat and made of an elastic material. The inner diameter of the gasket 9 may be larger than the diameter of the lower portion 3, such as one or a few centimeters larger than the diameter of the lower portion 3, so as to facilitate insertion of the lower portion 3 through the gasket 9 upon installation of the hull-fitted electronic device 2. Since the watertight surface 5 reaches all the way up onto the flange portion 4, and covers at least part of the underside of the flange portion 4, the tolerance of the dimensions of the gasket 9 as well as the exact position of the gasket 9 between the flange portion 4 and the seat 10 is less critical.

When the hull-fitted electronic device 2 is installed at the seat 10 and is in use, the lower portion 3 and the portion of the flange portion 4 delimited by the gasket 9 will be exposed to water and may therefore be referred to as a wet portion of the housing 14. The remaining portion of the housing 14 will be sealed from the water and may therefore be referred to as a dry portion of the housing 14. Since the surface 5 covers at least the wet portion of the housing 14, and optionally also at least part of the dry portion of the housing 14, a watertight barrier without any joints or seams covers at least the entire wet portion of the housing 14.

The through hole 11 of the seat 10 may optionally be tapered in a direction towards the water outside the hull. In the present example, an upper (and major) portion of the through hole 11 is continuously tapered (i.e. slightly conical) and a lower portion of the through hole 11 is stepwise tapered. That is, the diameter of the through hole is abruptly reduced at the lower portion of the through hole 11.

Figure 3:
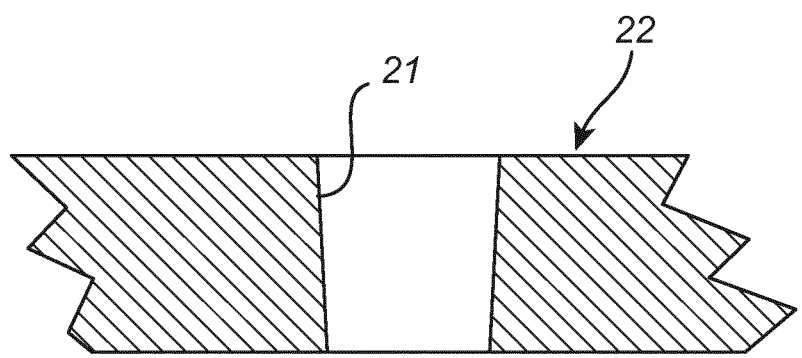
FIG. 3 shows cross-section of a portion of a seat according to an embodiment.
Figure 4:
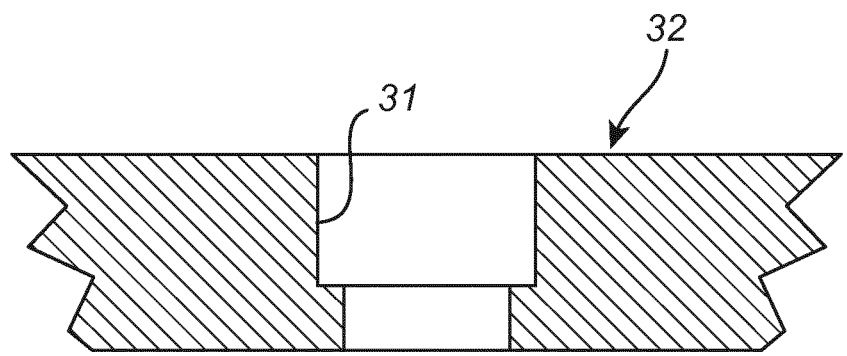
FIG. 4 shows cross-section of a portion of a seat according to another embodiment.

As illustrated in FIG. 3, the through hole 21 of the seat 22 may alternatively be completely continuously tapered in direction towards the water outside the hull. According to a further alternative, the through hole 31 of the seat 32 may be merely stepwise tapered in direction towards the water outside the hull, as illustrated in FIG. 4. Regardless of the shape of the through hole of the seat, the shape of the lower portion may either be adapted so as to match the shape of the through hole of the seat or may have a slightly different shape, such as straight, non-tapered.

The person skilled in the art realizes that the present invention by no means is limited to the embodiments described above. On the contrary, many modifications and variations are possible within the scope of the appended claims.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A hull-fitted electronic device for a vessel, the hull-fitted electronic device comprising:
   a transducer adapted to generate a signal to be transmitted into water outside a hull of the vessel, wherein the hull-fitted electronic device is adapted to be attached to a seat that is attachable to the hull of the vessel; and
   a housing encapsulating the transducer, the housing comprising a lower portion adapted to be inserted in a through hole of the seat and a flange portion adapted to be attached to the seat so as to support the lower portion in the through hole of the seat, wherein a flat gasket is disposed between the flange portion and the seat for preventing water leakage between the flange portion and the seat, wherein the lower portion and at least a portion of the flange portion located closest to the lower portion and delimited by the gasket when the flange portion is mounted to the seat comprise a surface of a material that is watertight and transparent to the signal generated by the transducer and are exposed to the surrounding water, and wherein a portion of the surface forms a window of the housing arranged to transmit the signal generated by the transducer to the water outside the hull;
   wherein the gasket has at least three openings, including a central opening having a diameter that is larger than an outer diameter of the lower portion of the housing.

2. The hull-fitted electronic device as defined in claim 1, wherein the surface is free from joints.

3. The hull-fitted electronic device as defined in claim 1, wherein said material comprises plastic.

4. The hull-fitted electronic device as defined in claim 3, wherein said plastic comprises one or more of epoxy or polyurethane.

5. The hull-fitted electronic device as defined in claim 1, wherein a surface of the flange portion facing the seat is at least partially covered by said material.

6. The hull-fitted electronic device as defined in claim 1, wherein the lower portion is cylindrical.

7. The hull-fitted electronic device as defined in claim 1, wherein the hull-fitted electronic device is a navigation device.

8. The hull-fitted electronic device as defined in claim 7, wherein the navigation device comprises one or more of a speed log or an echo sounder.

9. An arrangement for a vessel, the arrangement comprising:
   a seat comprising a through hole, the seat adapted to be attached to a hull of the vessel such that the through hole of the seat is aligned with a through hole of the hull;
   a gasket for engaging the seat; and
   a hull-fitted electronic device comprising:
      a transducer adapted to generate a signal to be transmitted into water outside the hull, wherein the hull-fitted electronic device is adapted to be attached to the seat, and
      a housing encapsulating the transducer, the housing comprising a lower portion adapted to be inserted in the through hole of the seat and a flange portion adapted to be attached to the seat, wherein the gasket is disposed between the flange portion and the seat for preventing water leakage between the flange portion and the seat so as to support the lower portion in the through hole of the seat, wherein the lower portion and at least a portion of the flange portion located closest to the lower portion and delimited by the gasket when the flange portion is mounted to the seat comprise a surface of a material that is watertight and transparent to the signal generated by the transducer and are exposed to the surrounding water, and wherein a portion of the surface forms a window of the housing arranged to transmit the signal generated by the transducer to the water outside the hull;
   wherein the gasket has at least three openings, including a central opening having a diameter that is larger than an outer diameter of the lower portion of the housing.

10. The arrangement as defined in claim 9, wherein the through hole of the seat is tapered in a direction towards the water outside the hull.

11. The arrangement as defined in claim 9, wherein the through hole of the seat is continuously tapered in a direction towards the water outside the hull.

12. An arrangement for placing in a through hole in a hull of a vessel below the water line, the arrangement comprising:
- a transducer adapted to generate a signal to be transmitted into the surrounding water outside the hull;
- a housing for receiving the transducer, the housing comprising a window for transmitting the signal, wherein a portion of the housing comprises a surface comprising a material that is watertight and transparent to the signal;
- a flat gasket for engaging a second portion of the housing; and
- a seat disposed in the through hole in the hull and engaging the gasket, the seat comprising a through hole coaxial to the hull through hole, wherein the seat through hole receives a portion of the housing portion containing the transducer;

wherein, when the housing is mounted to the seat, the entire portion of the housing delimited by the gasket, including the housing portion containing the transducer, is covered by the surface and exposed to the surrounding water, and wherein the gasket has at least three openings, including a central opening having a diameter that is larger than an outer diameter of the housing portion containing the transducer.

13. The hull-fitted electronic device as defined in claim 1, wherein the gasket does not touch the lower portion of the housing.

14. The arrangement as defined in claim 9, wherein the gasket is a flat gasket.

15. The arrangement as defined in claim 12, wherein the gasket does not touch the portion of the housing portion which contains the transducer.

16. The arrangement as defined in claim 9, wherein the material that is watertight and transparent to the signal generated by the transducer comprises one or more of epoxy or polyurethane.

17. The arrangement as defined in claim 9, wherein the transducer is a component of one or more of a speed log or an echo sounder.

18. The arrangement as defined in claim 12, wherein the material that is watertight and transparent to the signal comprises one or more of epoxy or polyurethane.

19. The arrangement as defined in claim 12, wherein the seat through hole is tapered in a direction towards the water outside the hull.

20. The arrangement as defined in claim 12, wherein the transducer is a component of one or more of a speed log or an echo sounder.

* * * * *